(12) United States Patent
Luong

(10) Patent No.: US 8,811,192 B2
(45) Date of Patent: Aug. 19, 2014

(54) METHODS FOR TESTING WIRELESS LOCAL AREA NETWORK TRANSCEIVERS IN WIRELESS ELECTRONIC DEVICES

(75) Inventor: Anh Luong, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 861 days.

(21) Appl. No.: 13/025,116

(22) Filed: Feb. 10, 2011

(65) Prior Publication Data

US 2012/0207030 A1   Aug. 16, 2012

(51) Int. Cl.
*H04L 12/26* (2006.01)

(52) U.S. Cl.
USPC ........ 370/245; 370/252; 455/423; 455/115.2; 455/226.1

(58) Field of Classification Search
None
See application file for complete search history.

(56) References Cited

U.S. PATENT DOCUMENTS

| | | | |
|---|---|---|---|
| 8,054,221 B1 * | 11/2011 | Luong et al. | 342/357.62 |
| 8,284,682 B2 * | 10/2012 | Huq et al. | 370/250 |
| 8,478,263 B1 * | 7/2013 | Lan et al. | 455/423 |
| 8,489,032 B2 * | 7/2013 | Gordiyenko et al. | 455/67.11 |
| 2001/0053176 A1 | 12/2001 | Fry et al. | |
| 2004/0130484 A1 | 7/2004 | Krasner | |
| 2005/0032493 A1 | 2/2005 | Sugiyama et al. | |
| 2007/0066268 A1 | 3/2007 | Simic et al. | |
| 2007/0285309 A1 | 12/2007 | Atkinson | |
| 2010/0117668 A1 | 5/2010 | Redlich et al. | |
| 2012/0122406 A1 * | 5/2012 | Gregg et al. | 455/67.11 |

FOREIGN PATENT DOCUMENTS

| | | |
|---|---|---|
| EP | 2120061 | 11/2009 |
| WO | 2010114796 | 9/2010 |

OTHER PUBLICATIONS

Dimpflmaier, Ronald W. et al. U.S. Appl. No. 12/638,850, filed Dec. 15, 2009.
Sanguinetti Louie J. et al. U.S. Appl. No. 61/363,485, filed Jul. 12, 2010.
Caballero, Ruben et al. U.S. Appl. No. 12/941,010, filed Nov. 5, 2010.
Luong, Anh et al. U.S. Appl. No. 12/913,718, filed Oct. 27, 2010.

* cited by examiner

*Primary Examiner* — Alex Skripnikov
(74) *Attorney, Agent, or Firm* — Park, Vaughan, Fleming & Dowler LLP

(57) ABSTRACT

An electronic device may include wireless circuitry such as cellular telephone transceiver circuitry and wireless local area network (WLAN) transceiver circuitry. The telephone transceiver may be used to establish long-range wireless connectivity, whereas the WLAN transceiver may be used to establish short-range wireless connectivity. The performance of the WLAN transceiver may suffer in the presence of heat-generating operations. The performance of the WLAN transceiver may be tested using test equipment while the electronic device is configured in a test mode and a normal user mode. During testing, the WLAN transceiver may be directed to transmit radio-frequency signals while the telephone transceiver is toggled on and off. The test equipment may be used to analyze the radio-frequency signals to measure the transmit power level, transmitter constellation error, transmit spectrum mask, and other performance parameters to determine whether that device under test satisfies design criteria.

23 Claims, 9 Drawing Sheets

METHODS FOR TESTING WIRELESS LOCAL AREA NETWORK TRANSCEIVERS IN WIRELESS ELECTRONIC DEVICES

BACKGROUND

This invention relates to testing electronic devices and more particularly, to wireless testing of electronic devices using testers and access points.

Electronic devices such as cellular telephones, portable computers, handheld media players, and other devices often contain wireless circuitry. The wireless circuitry may, for example, be used to support wireless local area networking (WLAN) functionality. In a typical scenario, a wireless electronic device may support IEEE 802.11 wireless networking standards (sometimes referred to as WiFi®).

Wireless test equipment is used to test wireless electronic devices. For example, wireless test equipment is sometimes used to perform WLAN testing. A tester may, for example, perform packet loopback testing. In packet loopback testing, control messages are transmitted from a tester to a device under test (DUT) in the form of a number of test data packets. The control messages instruct the DUT to transmit acknowledgment data packets back to the tester. The acknowledgement data packets transmitted from the DUT are then captured by the tester. The tester analyzes the acknowledgement packets using its built-in analysis capabilities to extract radio-frequency parametric data such as transmit power and transmitter constellation error.

As an example, a wireless electronic device such as a cellular telephone may include cellular telephone transceiver circuitry that is used to make telephone calls. The cellular telephone transceiver circuitry contains power amplifier circuitry that transmits radio-frequency (RF) signals to a nearby base station. If care is not taken, a rapid change in heat generated from the power amplifier circuitry may adversely affect the capability of the WLAN circuitry to properly transmit data (i.e., to transmit data having power levels and transmitter constellation errors that satisfy performance criteria).

Conventional arrangements for testing WLAN circuit functionality involve measuring the performance of the WLAN circuitry while the power amplifier circuitry is placed in an active mode that constantly transmits radio-frequency signals or in an inactive mode during which the power amplifier is turned off. The performance of the WLAN circuitry, however, may be most adversely affected when the thermal transient (i.e., the instantaneous change in heat generated by the cellular telephone transceiver circuitry) is maximized. Testing WLAN circuitry performance using this conventional approach is not a rigorous test of WLAN circuitry performance, because leaving the power amplifier circuitry in the active or inactive mode does not maximize thermal transient.

It would therefore be desirable to be able to provide improved ways of testing WLAN transceiver circuitry performance.

SUMMARY

An electronic device such as a portable user device may include wireless communications circuitry such as cellular telephone transceiver circuitry, wireless local area network (WLAN) transceiver circuitry (e.g., a transceiver that can support IEEE 802.11 communications standards), satellite navigation system receiver, at least one local oscillator, and other wireless circuitry. The local oscillator may be a crystal oscillator that serves to generate reference clock signals for the different wireless communications circuitry on the electronic device.

The user device may be used perform various tasks. For example, the user device may be used to make telephone calls, browse the Internet, run gaming applications, take pictures, etc. Performing these tasks may produce thermal transient that momentarily raises the temperature of the WLAN transceiver circuitry (e.g., WiFi® transceiver circuitry).

If, for example, the WiFi® transceiver circuitry suffers from rapid changes in temperature (e.g., if a high temperature gradient is produced on a printed circuit board on which the WiFi® transceiver circuitry is mounted), the WiFi® transceiver circuitry may not function properly. It may be desirable to test WiFi® transceiver performance in the presence of such thermal transient (i.e., heat-inducing) activities.

A test system in which a device under test (DUT) is tested may include test equipment such as a base station emulator, a tester, and a test host. The DUT may be configured with a test operating system (e.g., an operating system that lacks a graphical user interface). The base station emulator, the tester, and the DUT may be coupled to the test host during testing.

During testing, the DUT may be directed to transmit radio-frequency signals to the tester at a maximum output power level over a non-protocol-compliant link (or over a protocol-compliant link, if desired). The test host may direct the cellular telephone transceiver circuitry to turn on to generate a rising temperature transient profile and to turn off to generate a falling temperature transient profile. The tester may be directed to analyze the radio-frequency signals to measure performance parameters such as transmit output power levels, transmitter constellation errors, transmit spectrum masks, etc. The test host may then be used to determine whether the DUT is a passing device or a failing device based on the measured results.

Another test system in which a device under test (DUT) is tested may include test equipment such as a base station emulator, non-signaling tester, signaling tester, an access point, and a test host. The DUT may be configured with a normal user operating system (e.g., an operating system that includes a graphical user interface). The base station emulator, the access point, and the DUT may be coupled to the test host during testing.

During testing, the DUT may register with the base station emulator. The DUT may establish a protocol-compliant data link with the signaling tester or access point. Data packets may be conveyed between the access point and the DUT over the protocol-compliant data link. The cellular telephone transceiver circuitry may operate in an active mode to generate a rising temperature transient profile and a sleep mode to generate a falling temperature transient profile. The access point may be directed to analyze the received data packets to measure performance parameters such as transmit output power levels, transmitter constellation errors, transmit spectrum masks, data transfer rate, etc. The test host may then be used to determine whether the DUT is a passing device or a failing device based on the measured results.

Further features of the present invention, its nature and various advantages will be more apparent from the accompanying drawings and the following detailed description.

DETAILED DESCRIPTION

This relates to perform radio-frequency testing of electronic devices.

The electronic devices that is tested may include equipment such as cellular telephones, computers, computer monitors with built in wireless capabilities, desktop computers, portable computers, handheld computers, laptop computers, tablet computers, media players, satellite navigation system devices, and other wireless electronic equipment. An electronic device being tested is typically referred to as a device under test (DUT).

Test equipment may be used in performing wireless tests on a device under test. The test equipment may be based on a single test instrument. The test equipment may also be based on multiple pieces of test equipment and associated computers. For example, test systems may be used in which a tester is implemented using one or more networked computers, shared databases, racks of one or more pieces of test equipment, etc.

Figure 1:
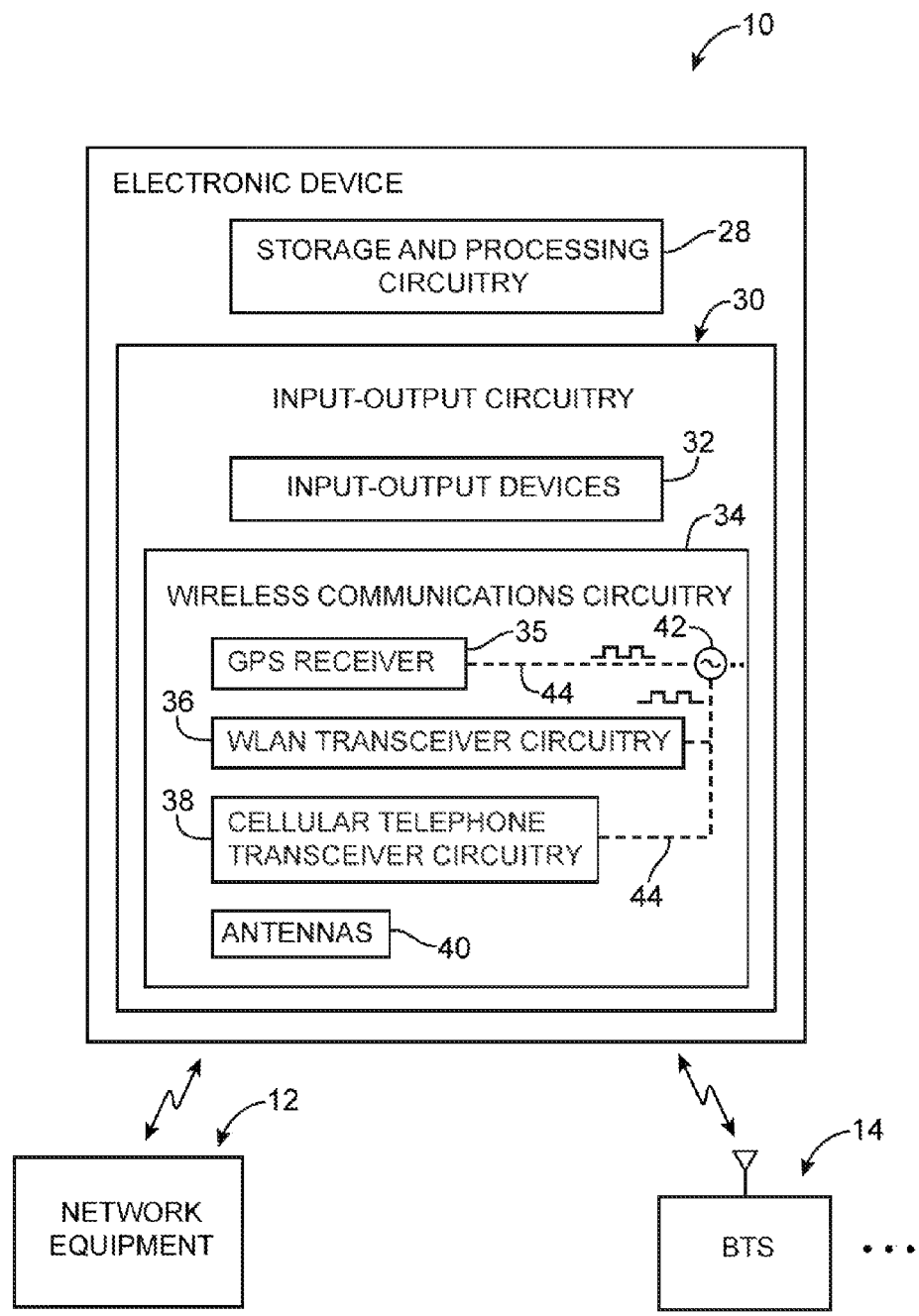
FIG. 1 is a diagram of an illustrative electronic device with wireless communications circuitry in accordance with an embodiment of the present invention.

A schematic diagram of an electronic device such as electronic device 10 is shown in FIG. 1. As shown in FIG. 1, electronic device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network (WLAN) protocols (e.g., IEEE 802.11 protocols—sometimes referred to as WiFi®), protocols for other short-range wireless communications links such as the Bluetooth® protocol, cellular telephone protocols, etc.

Circuitry 28 may be configured to implement control algorithms that control the use of antennas in device 10. For example, to support antenna diversity schemes and MIMO schemes or beam forming or other multi-antenna schemes, circuitry 28 may perform signal quality monitoring operations, sensor monitoring operations, and other data gathering operations and may, in response to the gathered data, control which antenna structures within device 10 are being used to receive and process data. As an example, circuitry 28 may control which of two or more antennas is being used to receive incoming radio-frequency signals, may control which of two or more antennas is being used to transmit radio-frequency signals, may control the process of routing incoming data streams over two or more antennas in device 10 in parallel, etc.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 35 (e.g., for receiving satellite positioning signals at 1575 MHz) or GLONASS (e.g., for receiving satellite positioning signals at 1602 MHz), transceiver circuitry such as transceiver circuitry 36 and 38, and antenna circuitry 40. Transceiver circuitry 36 may handle 2.4 GHz and 5 GHz bands for WiFi® (IEEE 802.11) communications and may handle the 2.4 GHz Bluetooth® communications band. Circuitry 36 may sometimes be referred to as wireless local area network (WLAN) transceiver circuitry (to support WiFi® communications) and Bluetooth® transceiver circuitry. Circuitry 34 may use cellular telephone transceiver circuitry 38 (sometimes referred to as cellular radio) for handling wireless communications in cellular telephone bands such as bands at 850 MHz, 900 MHz, 1800 MHz, 1900 MHz, and 2100 MHz or other cellular telephone bands of interest.

Examples of cellular telephone standards that may be supported by wireless circuitry 34 and device 10 include: the Global System for Mobile Communications (GSM) "2G" cellular telephone standard, the Evolution-Data Optimized (EVDO) cellular telephone standard, the "3G" Universal Mobile Telecommunications System (UMTS) cellular telephone standard, the "3G" Code Division Multiple Access 2000 (CDMA 2000) cellular telephone standard, and the "4G" Long Term Evolution (LTE) cellular telephone standard. Other cellular telephone standards may be used if desired. These cellular telephone standards are merely illustrative.

Wireless communications circuitry 34 may include circuitry for other short-range and long-range wireless links if desired. For example, wireless communications circuitry 34 may include wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structure, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link and another type of antenna may be used in forming a remote wireless link.

Wireless communications circuitry 34 may include an oscillator such as crystal oscillator 42. Crystal oscillator 42 may provide a highly stable local clock that is used as a reference clock signal. As shown in FIG. 1, oscillator 42 may feed local clock signals to GPS receiver (or GPS unit) 35, transceiver circuitry 36, cellular radio 38, and other wireless circuits over path 44. If desired, wireless communications circuitry 34 may include a plurality of oscillators 42, where each of the plurality of oscillators 42 is used to generate a stable local clock signal for a respective transceiver circuit. GPS receiver 35, transceiver circuitry 36, cellular telephone transceiver circuitry 38, and other wireless circuitry on device 10 may rely on the ability of crystal oscillator 42 to generate precise/accurate control clock signals to operate properly during wireless transmission.

As shown in FIG. 1, device 10 may communicate with a base station such as base transceiver station (BTS) 14. In particular, radio-frequency signals may be conveyed between cellular telephone transceiver circuitry 38 (sometimes referred to as cellular radio or cellular telephone radio) and base station 14 during a telephone call (as an example). WLAN circuitry 36 may rely on local clock signals generated by the same oscillator 42 used by cellular telephone circuitry 38 or by a separate oscillator 42 to process radio-frequency signals at desired frequencies during wireless transmission.

Device 10 may also communicate with networking equipment such as networking equipment 12 (see, e.g., FIG. 1). Networking equipment 12 may include wireless access points, routers, switches, bridges, cabling, control circuitry, and other networking equipment. For example, WLAN transceiver circuitry 36 may establish a communications link with network equipment 12. When the communications link is established, data may be conveyed in the form of packets between circuitry 12 and network equipment 12.

The ability and efficiency of WLAN transceiver circuitry 36 to transmit radio-frequency signals to network equipment 12 at desired performance levels is strongly dependent on the accuracy of crystal oscillator 42. Even a small error in the clock signals generated by oscillator 42 may result in unacceptable shifts in frequency during signal frequency conversions (e.g., when up-converting signals from baseband to radio frequencies), undesirable reduction in transmit power levels, transmitter constellation errors that exceed design criteria, and other adverse effects.

The accuracy of crystal oscillator 42 is generally acceptable during normal operating conditions (e.g., when device 10 is not running processor-intensive applications and is not using heat-producing components). The performance of WLAN transceiver circuitry 36 may, however, be adversely affected by heat-inducing operations on device 10. For example, a sudden change in temperature (e.g., a high temperature gradient or low temperature gradient) produced as cellular telephone radio circuitry 38 is enabled (or disabled) can cause errors in the clock signals generated using oscillator 42, thereby resulting in WLAN circuitry performance degradation. It may therefore be desirable to test WLAN transceiver performance in the presence of high/low temperature-gradient-inducing activities.

During testing, device 10 may be configured in a test mode, normal user mode, and other modes of operation. Device 10 may be loaded with a test operating system (e.g., an operating system that lacks a graphical user interface) during test mode, whereas device 10 may be loaded with a normal operating system (e.g., an operating system that includes a graphical user interface) during normal user mode. Device 10 configured to operate in the test mode behaves as a passive device that only performs operations upon receiving direct commands from a test host, whereas device 10 configured to operate in the normal user mode behaves as an active device that may automatically perform wireless operations without receiving direct commands from the test host (as an example).

Figure 2:
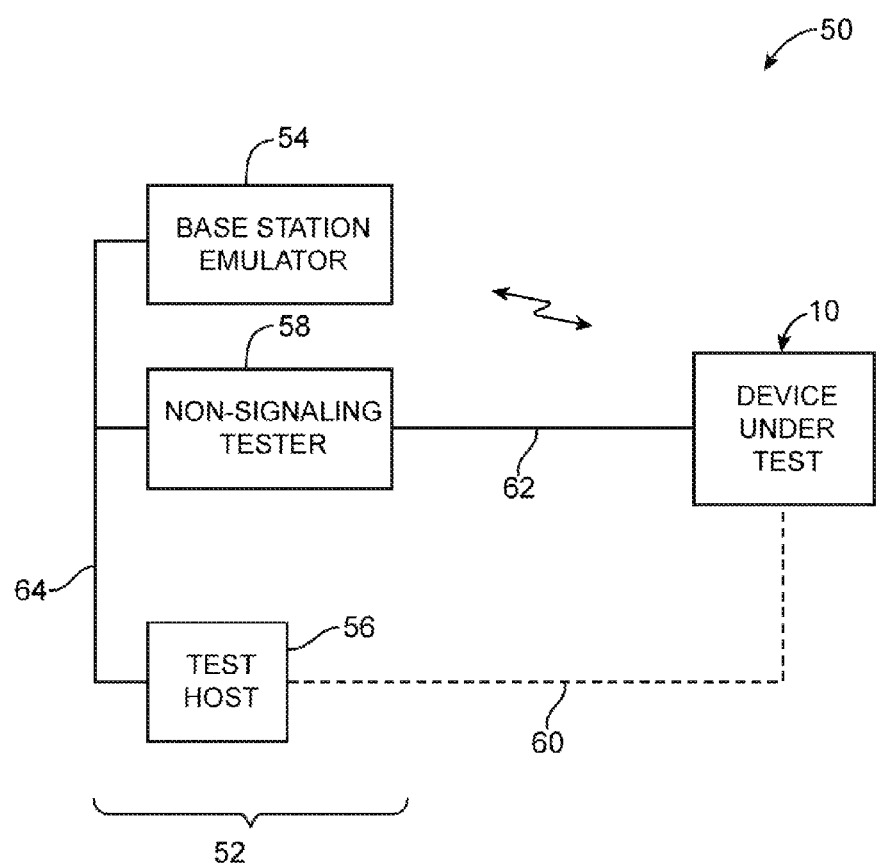
FIG. 2 is a diagram of an illustrative test system having a non-signaling tester in accordance with an embodiment of the present invention.

FIG. 2 is a diagram showing a test system in which device 10 configured in the test mode can be tested. Device 10 being tested may sometimes be referred to as a device under test (DUT). Test system 50 may include test equipment 52 that is used to test DUT 10. Test equipment 52 may include base station emulator 54, non-signaling tester 58, test host 56, control circuitry, network circuitry, cabling, and other test equipment.

Base station emulator 54 is a device that emulates the behavior of an actual base transceiver station (BTS). Base station emulator 54 may communicate with DUT 10 over a wireless path or over a wired connection in test system 50. Non-signaling tester 58 may be may be a radio communications tester of the type that is sometimes referred to as a test box or a radio communications tester. Non-signaling tester 58 may, for example, be the non-signaling all-in-one radio communication tester (e.g., a single device that includes a vector signal analyzer and a vector signal generator). Non-signaling tester 58 may be used to perform radio-frequency parametric tests for a variety of different radio-frequency communications bands and channels. DUT 10 may communicate with non-signaling tester 58 over a conducted (as shown in FIG. 2) path or over a wireless path.

Base station emulator 54 and non-signaling tester 58 may be coupled to test host 56 (e.g., a personal computer) through line 64. DUT 10 may be coupled to test host 56 (as indicated by dotted line 60) and to non-signaling tester 58 through line 62. The connection represented by line 60 may be a Universal Serial Bus (USB) based connection, a Universal Asynchronous Receiver/Transmitter (UART) based connection, or other suitable types of connections.

During testing, test host 56 may control base station emulator 54 and non-signaling tester 58 by sending commands over line 64 and may control DUT 10 by sending commands over line 60. DUT 10 may, for example, be directed to transmit radio-frequency signals at a maximum output power level to non-signaling tester 58 using different WLAN protocols (e.g., at 802.11a, 802.11b, 802.11g, 802.11n, etc.), across different channels (e.g., at the 2.4 GHz band, 5 GHz band, etc.), and at different data rates.

For example, DUT 10 may be configured to transmit signals using the IEEE 802.11n communications protocol. DUT 10 may transmit signals in different channels in the 2.4 GHz band or the 5 GHz band. DUT 10 may transmit RF signals having a bandwidth of 20 MHz at data rates such as 6.5, 13, 19.5, 26, 39, 52, 58.5, and 65 Mbps and may transmit RF signals having a bandwidth of 40 MHz at data rates such as 13.5, 27, 40.5, 54, 81, 108, 121.5, and 135 Mbps (as examples). If desired, DUT 10 may be configured to transmit RF signals using other communications standards in any channel at any suitable data rate during testing.

Non-signaling tester 58 may be used to analyze the RF signals received from DUT 10. The analyzed results may then be gathered by test host 56. Test host 56 may be used to determine whether DUT 10 is a passing DUT or a failing DUT depending on the gathered results.

Figure 3:
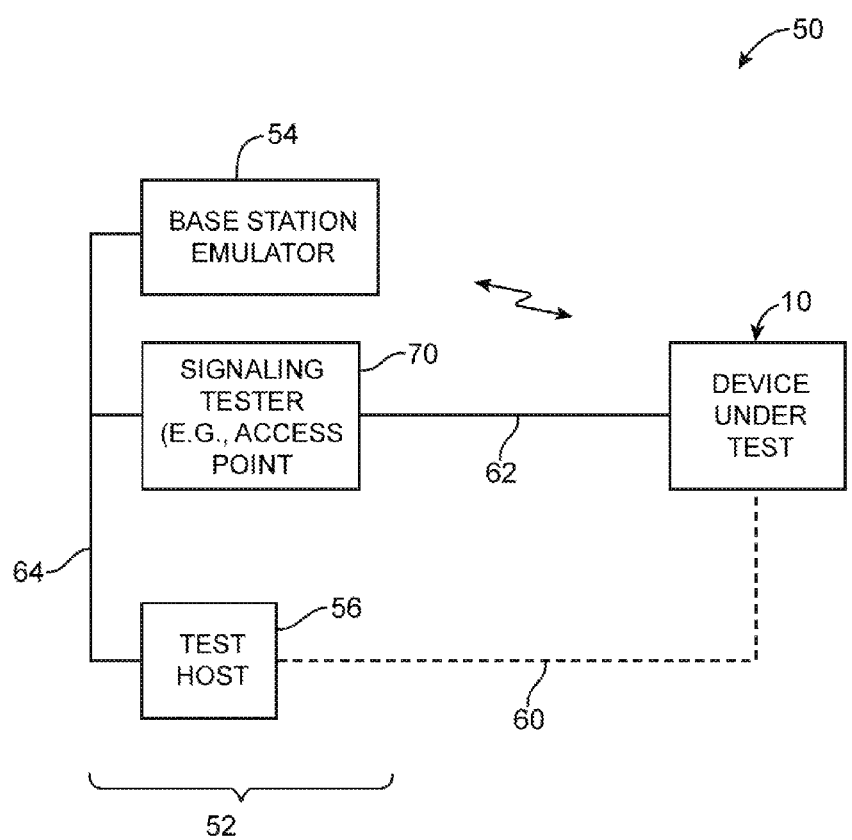
FIG. 3 is a diagram of an illustrative test system having a signaling tester (e.g., an access point) in accordance with an embodiment of the present invention.

FIG. 3 is a diagram showing a test system in which device 10 configured in the normal user mode can be tested. Test system 50 may include test equipment 52 that is used to test DUT 10. Test equipment 52 may include base station emulator 54, signaling tester 70, test host 56, control circuitry, network circuitry, cabling, and other test equipment. Signaling tester 70 may be a device that allows DUT 10 to connect to a network (e.g., to the Internet) using WiFi® or other WLAN communications standards. DUT 10 may communicate with signaling tester 70 over a conducted (as shown in FIG. 3) path or over a wireless path. Base station emulator 54 and signaling tester 70 may be coupled to test host 56 through line 64. DUT 10 may be coupled to test host 56 (as indicated by dotted line 60) and to signaling tester 70 through line 62.

During testing, test host 56 may control base station emulator 54 and signaling tester 70 by sending commands over line 64 and may control DUT 10 by sending commands over line 60. Test host 56 may direct signaling tester 70 to broadcast test packets. In response to receiving the test packets broadcast from signaling tester 70, DUT 10 may transmit acknowledgement packets back to access point 70. DUT 10 may be configured to transmit packets using different WLAN protocols across different channels at different data rates.

For example, DUT 10 may be configured to transmit signals using the IEEE 802.11a communications protocol. DUT 10 may transmit data in different channels in the 5 GHz band. DUT 10 may transmit packets at data rates such as 6, 9, 12, 18, 24, 36, 48, and 54 Mbps (as examples). If desired, DUT 10 may be configured to transmit RF packets using other communications standards in any channel at any suitable data rate during testing.

Signaling tester 70 may serve as a spectrum analyzer to analyze the data received from DUT 10. The analyzed results may then be gathered by test host 56. Test host 56 may be used to determine whether DUT 10 is a passing DUT or a failing DUT depending on the gathered results.

Figure 4:
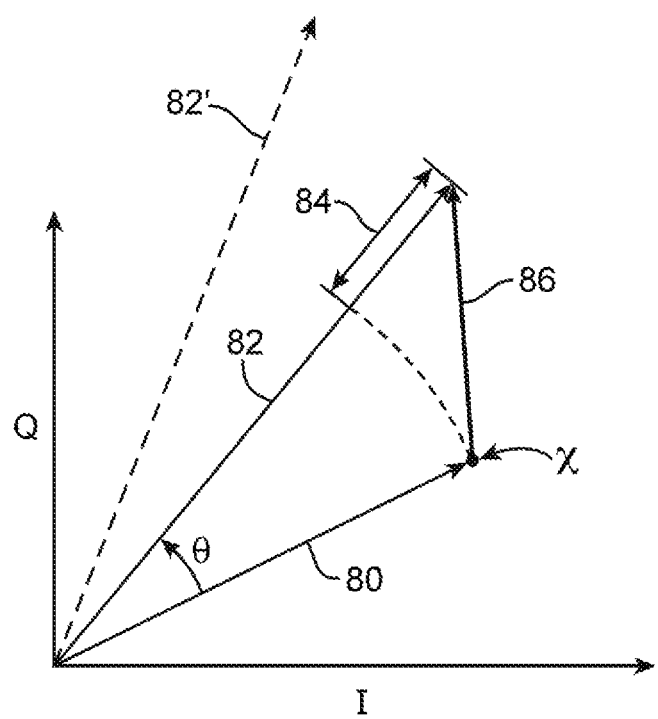
FIG. 4 is a diagram illustrating constellation error in accordance with an embodiment of the present invention.

One metric that can be used to determine the quality of the radio-frequency signals transmitted by DUT 10 during testing is transmitter constellation error. FIG. 4 is a plot that illustrates the constellation error concept. The error vector magnitude or EVM (sometimes referred to as receive constellation error) is a figure of merit for assessing the quality of digitally modulated radio-frequency signals for digital radio transceivers.

The radio-frequency signals may be represented by vectors in a complex plane (e.g., an I-Q plane in which the in-phase or I axis is the real axis and the quadrature or Q axis is the imaginary axis). As shown in FIG. 4, vector 80 may represent an ideal reference signal. In practice, however, signals transmitted from a radio transceiver may suffer from various implementation non-idealities (e.g., carrier leakage, low image rejection radio, phase noise, etc.) that cause the actual signal to deviate from the ideal locations on the I-Q plane.

For example, vector 82 may represent a measured signal. The magnitude error is represented by segment 84, whereas the phase error is represented by angle θ. The vector difference between ideal signal vector 80 and measured signal vector 82 yields an error vector (see, bolded vector 86 in FIG. 4). The magnitude or length of error vector 86 is defined as the error vector magnitude. EVM is typically expressed in decibels (dB). Different modulation schemes may yield different acceptable levels of EVM. For example, the 16-QAM (Quadrature Amplitude Modulation) scheme may have a maximum allowed EVM of −25 dB, whereas the 64-QAM scheme may have a maximum allowed EVM of −30 dB.

Small errors in the clock signals generated by oscillator 42 may cause vector 82 to change in magnitude and/or deviate even further from ideal location X (see, e.g., vector 82' in FIG. 4). Changing the measured signal vector in this way due to oscillator inaccuracy may result in an error vector magnitude that exceeds the maximum allowed EVM. It is therefore desirable to test WLAN circuitry performance in the presence of heat-generating tasks that may cause errors in oscillator 42.

Figure 5:
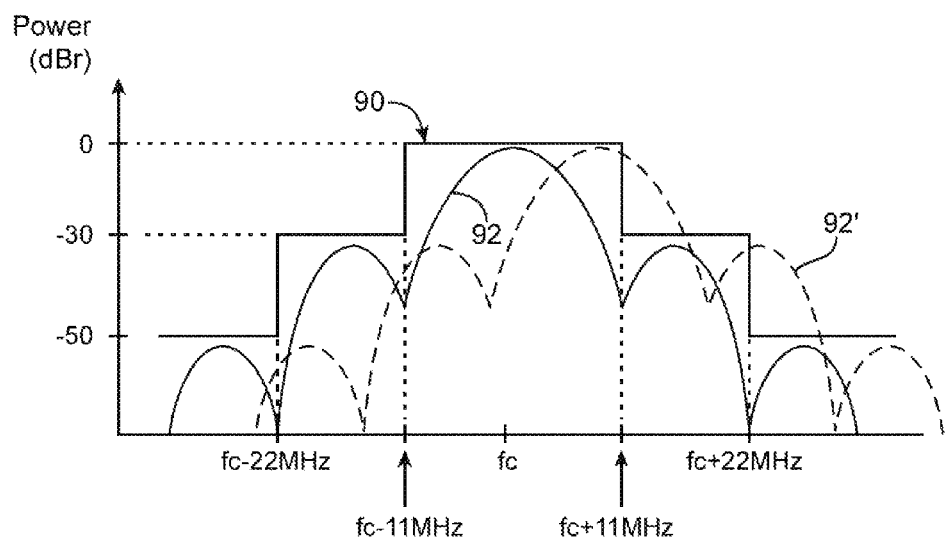
FIG. 5 is a diagram illustrating a spectral mask in accordance with an embodiment of the present invention.

The IEEE 802.11 standards also specify a transmit spectrum mask requirement that defines the permitted power distribution in each channel. A transmit spectrum mask (sometimes referred to as a channel mask or transmission mask) is a set of lines defined to reduce adjacent-channel interference by limiting the amount of power at frequencies beyond a given bandwidth. As shown in FIG. 5, spectral mask 90 requires that signals be attenuated by at least 30 dB from its peak power level at ±11 MHz from center frequency fc and attenuated by at least 50 dB from its peak power level at ±22 MHz from center frequency fc (as an example).

Characteristic curve 92 may represent a satisfactory transmitted signal power density profile, because each point on curve 92 is below the constraint set by spectral mask 90. In the example of FIG. 5, the channel is effectively 22 MHz wide. The spectral mask defines output power restrictions to ensure that signals stay within their designated channel so that the signals do not leak or interfere with adjacent channels. Small errors in the clock signals generated by oscillator 42 may cause profile 92 to shift in frequency (see, e.g., curve 92' in FIG. 5). Shifting the signal power density profile due to oscillator inaccuracy may result in violation of the spectral mask requirement (e.g., portions of curve 92' exceed the power constraints set by mask 90). It is therefore desirable to test WLAN circuitry performance in the presence of heat-generating tasks that may cause errors in oscillator 42.

Figure 6:
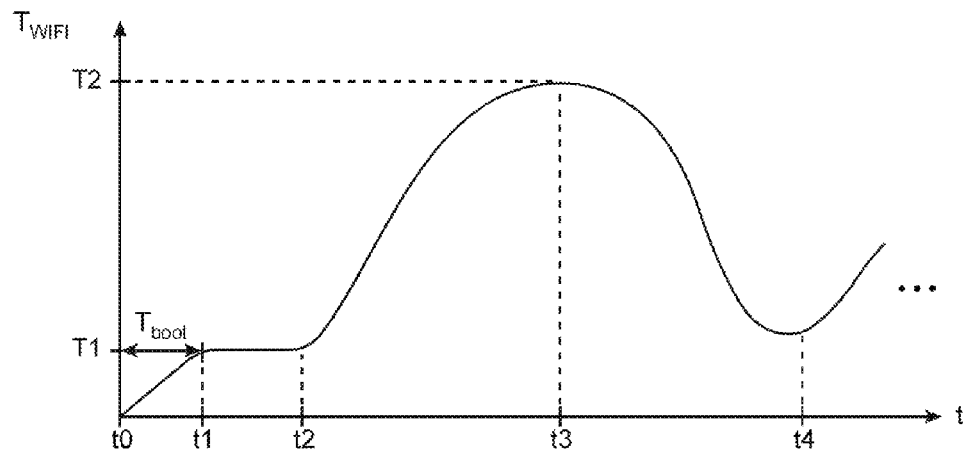
FIG. 6 is a graph illustrating how the temperature of a wireless local area network transceiver may vary in time as thermal transient operations are performed in accordance with an embodiment of the present invention.

WLAN transceiver circuitry (e.g., WiFi® transceiver circuitry) 36 may experience performance degradation in the presence of high/low temperature gradients. For example, WiFi® circuitry 36 may transmit radio-frequency signals at insufficient transmit output power levels, excessively high error vector magnitude levels, or insufficient data rates during activation and termination of a heat-inducing operation. FIG. 6 is a graph showing how the temperature of WiFi® transceiver circuitry 36 ($T_{WIFI}$) may vary in time during testing of DUT 10. At time t0, DUT 10 is turned on. DUT 10 may be loaded with a test operating system (e.g., so that the behavior of DUT 10 may be directly controlled using test host 56) or may be loaded with a normal user operating system (e.g., DUT 10 may be loaded with default user applications, graphical user interface, etc.).

At time t1, $T_{WIFI}$ reaches normal operating temperature T1. The time it takes for DUT 10 to power up (e.g., the time period from time t0 to t1) may be referred to as boot-up time $T_{BOOT}$. At time t1, cellular telephone transceiver circuitry 38 may initiate registration with base station emulator 54 and may begin sending requests to establish a telephone call. At time t1, test host 56 may also direct WiFi® transceiver circuitry 36 to establish/authenticate a data communications link with signaling tester 70 (if test setup 50 of FIG. 3 is used).

At time t2, DUT 10 may be directed to perform certain tasks that cause internal device circuitry (e.g., storage and processing circuitry 28, cellular telephone radio 38, transceiver circuits 36, etc.) to generate additional heat. For example, a user may want to make a telephone call, start a gaming application, launch a web browser, etc. Different tasks may vary in processing intensity and may cause the peripheral circuitry to generate different heat profiles.

Consider a scenario in which DUT 10 is directed to begin cellular transmission by turning on cellular telephone radio 38 at time t2. Activating cellular telephone transmission may involve turning on power amplifier circuitry in circuitry 38. Turning on the power amplifier circuitry may cause temperature $T_{WIFI}$ to rise rapidly (see, e.g., FIG. 6).

Figure 7:
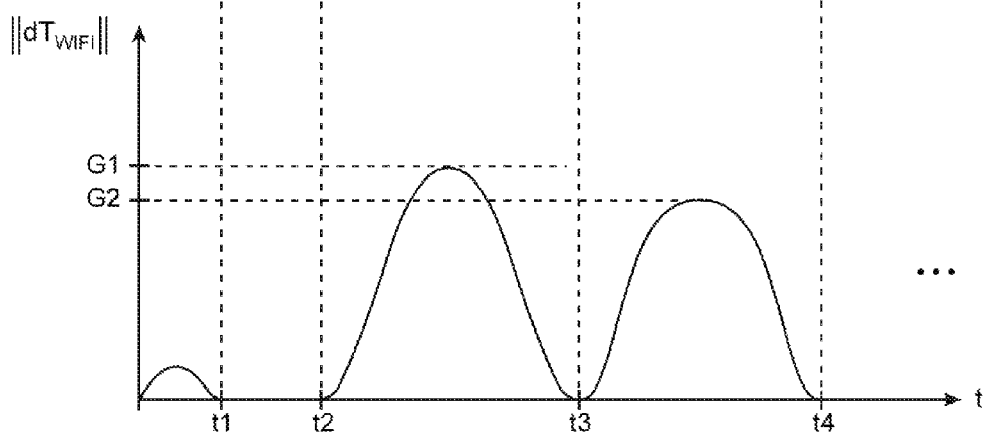
FIG. 7 is a graph showing how the wireless local area network transceiver of FIG. 6 may experience a temperature gradient that varies in time as thermal transient operations are performed in accordance with an embodiment of the present invention.

This sudden change in $T_{WIFI}$ is illustrated in FIG. 7. FIG. 7 is a graph showing the magnitude of the temperature gradient $\|\delta T_{WIFI}\|$ as a function of time. Temperature gradient is a measure of the instantaneous change in $T_{WIFI}$. The temperature gradient characteristic curve of FIG. 7 can be calculated by taking the first derivative of the temperature curve of FIG. 6 (as an example). As shown in FIG. 7, temperature gradient $\|\delta T_{WIFI}\|$ reaches a peak at gradient level G1 after time t2. The ability of circuitry 36 to transmit radio-frequency signals at desired performance levels may be adversely affected by such high temperature gradient levels.

At time t3, the temperature-inducing task may be turned off (e.g., cellular radio transceiver 38 may be turned off). Similarly, turning off the power amplifier circuitry in radio 38 may cause temperature $T_{WIFI}$ to fall. As shown in FIG. 7, temperature gradient $\|\delta T_{WIFI}\|$ reaches a peak at gradient level G2 after time t3. Level G2 may have the same value as G1 or may be greater than G1. The ability of circuitry 36 to transmit radio-frequency signals at desired performance levels may be adversely affected by such high temperature gradient levels. At time t4, cellular telephone transceiver circuitry 38 may be enabled to continue testing circuitry 38.

As shown in FIG. 6, WiFi® transceiver circuitry 36 is given a 250 millisecond (ms) time period to transmit radio-frequency signals in response to enabling a heat-inducing task (e.g., from time t2 to t3) and in response to disable the heat-inducing task (e.g., from time t3 to t4). If desired, this allotted (predetermined) time period may be less than 250 ms seconds or more than 250 ms.

The timing diagrams of FIGS. 6 and 7 are merely illustrative. The heat experienced by transceiver circuitry 36 during testing may have any suitable temperature profile.

Different types of test arrangements may be used during testing of DUT 10. In one suitable arrangement, DUT 10 may be tested using a "non-signaling" test arrangement. The non-signaling test approach may be suitable for testing DUT 10 configured with a test operating system. In the non-signaling arrangement, test host 56 may direct cellular telephone transceiver circuitry 38 to broadcast radio-frequency signals at a maximum output power level without establishing a protocol-based wireless connection with base station emulator 54 (e.g., base station emulator may not be used during non-signaling testing).

Figure 8:
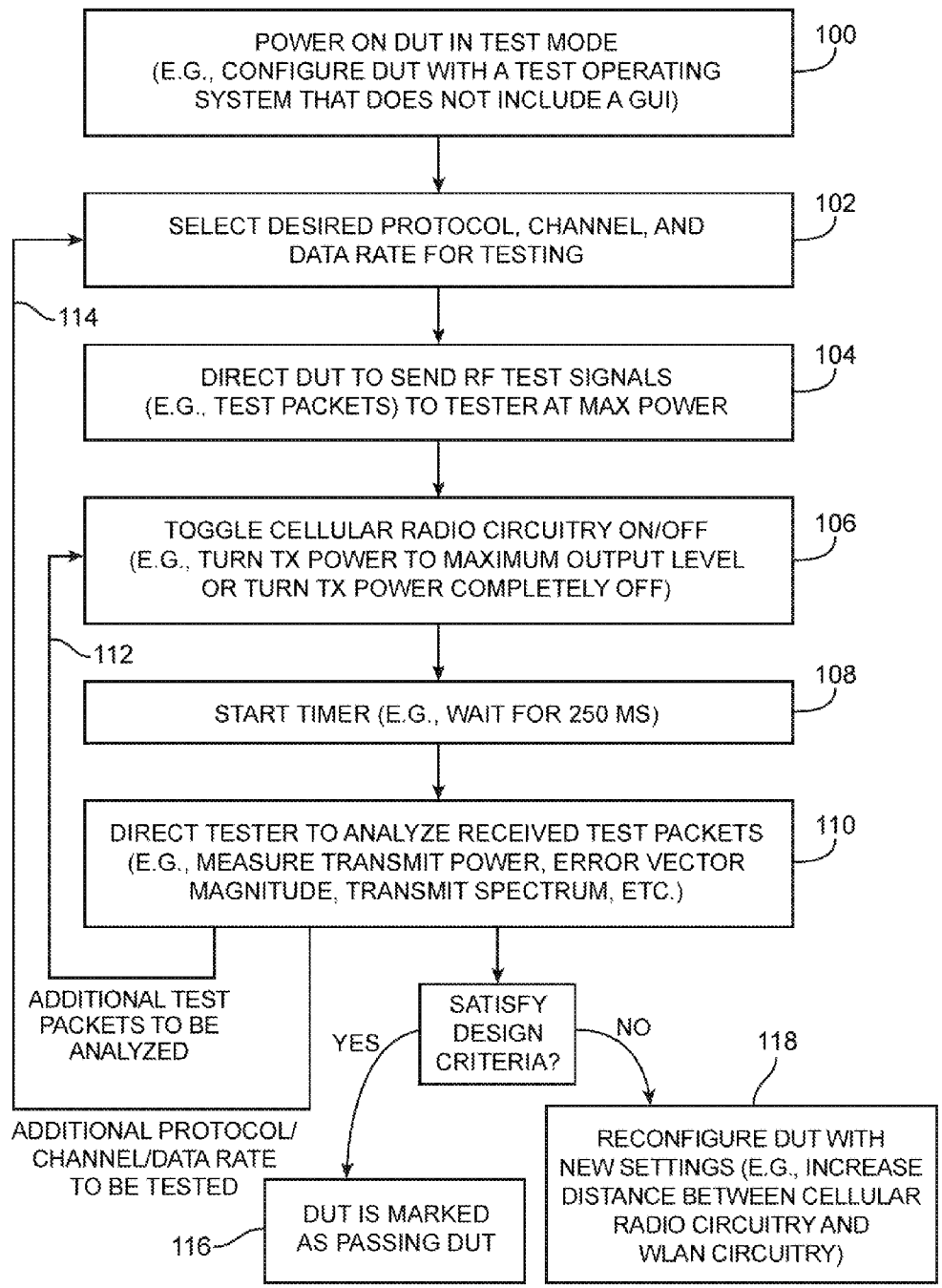
FIG. 8 is a flow chart of illustrative steps involved in performing loopback testing for an electronic device operating in test mode in accordance with an embodiment of the present invention.

FIG. 8 shows steps involved in testing DUT 10 using the non-signaling arrangement (e.g., using test setup 50 of FIG. 2). At step 100, DUT 10 is powered on in test mode (e.g., DUT 10 is loaded with a test operating system lacking a graphical user interface). At step 102, test host 56 may select a desired protocol, channel, and data rate for testing. For example, test host 56 may configure circuitry 36 for transmission of radio-frequency signals using the 802.11b protocol in the 2.422 GHz channel (sometimes referred to as channel 3) at 5.5 Mbps.

At step 104, test host 56 may direct DUT 10 to transmit RF test signals (e.g., in the form of test packets) to non-signaling tester 58 at a maximum output power level using the settings selected during step 102. At step 106, cellular telephone transceiver circuitry 38 may be toggled on or off (e.g., the power amplifier circuitry may be configured to transmit RF signals at maximum output power level or may be turned completely off) to initiate a high temperature gradient-inducing operation.

At step 108, a timer may be started that sets a period of time (e.g., 250 ms) during which DUT 10 transmits test packets to non-signaling tester 58 while $T_{WIFI}$ is rising/falling. At step 110, test host 56 may direct non-signaling tester 58 to analyze the test packets received from circuitry 36. For example, non-signaling tester 58 may be directed to analyze the test packets to measure the transmit power level, transmitter constellation error, and transmit spectrum mask. If desired, other radio-frequency performance metrics such as adjacent channel leakage ratio, signal-to-noise ratio, frequency response, gain, and gain compression may be measured at step 110.

Processing may loop back to step 106 if there are additional test packets to be analyzed (e.g., steps 106, 108, and 110 may be repeated for any suitable number of cycles to gather a sufficient set of measured data), as indicated by path 112. Processing may loop back to step 102 to perform testing at another setting (e.g., to select another communications protocol, channel, and data rate for testing), as indicated by path 114.

After sufficient data has been gathered across the desired settings (e.g., across the different protocols, bands, channels, data rates, etc.), test host 56 may be used to determine whether DUT 10 is a passing DUT or a failing DUT. For example, if the gathered data exhibits satisfactory transmit power levels, transmitter constellation errors, and/or transmit spectrum masks, DUT 10 may be marked as a passing DUT (step 116).

If the gathered data exhibits unsatisfactory transmit power levels, transmitter constellation errors, and/or transmit spectrum masks, circuitry 36 fails to satisfy design criteria and DUT 10 is marked as a failing DUT (step 118). If desired, DUT 10 may be configured with new design settings (e.g., the distance between cellular telephone radio circuitry 38 and WiFi® transceiver circuitry 36 may be increased to reduce the interference between circuitry 36 and 38 and to further isolate WiFi® circuitry 36 from the heat generated by circuitry 38).

In another suitable arrangement, DUT 10 may be tested using a "signaling" test arrangement (e.g., using test setup 50 of FIG. 3). The signaling test approach may be suitable for testing DUT 10 loaded with a normal user operating system (e.g., DUT 10 may be loaded with default user applications, graphical user interface, etc.). If desired, DUT 10 may also be configured in the test mode.

Figure 9:
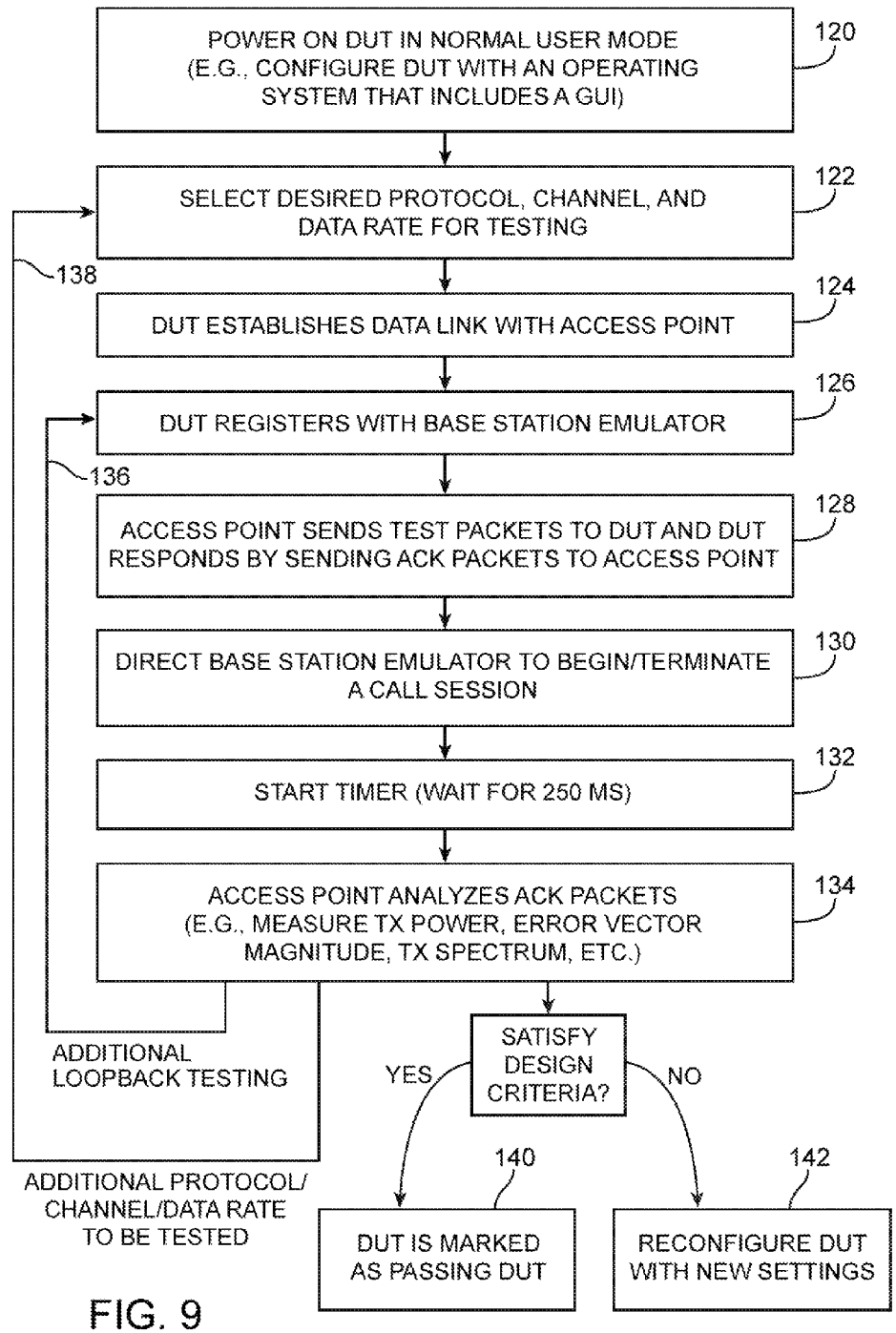
FIGS. 9 and 10 are flow charts of illustrative steps involved in performing wireless testing for an electronic device operating in normal user mode in accordance with an embodiment of the present invention.

FIG. 9 shows steps involved in testing DUT 10 using the signaling arrangement. At step 120, DUT 10 is powered on in normal user mode. At step 122, test host 56 may select a desired protocol, channel, and data rate for testing. For example, test host 56 may configure circuitry 36 for transmission of radio-frequency signals using the 802.11g protocol in the 2.467 GHz channel (sometimes referred to as channel 12) at 54 Mbps.

At step 124, DUT 10 may establish a protocol-compliant data communications link with signaling tester 70. At step 126, DUT 10 automatically registers with base station emulator 54 (e.g., DUT 10 notifies base station emulator 54 of its presence).

At step 128, signaling tester 70 may send test packets to DUT 10. In response to the test packets, circuitry 36 of DUT 10 may send acknowledgement packets back to access point 70. Sending packets back and forth using this approach may sometimes be referred to as loopback testing.

At step 130, test host 56 may direct base station emulator 54 to begin/terminate a call session. During an active telephone call session, radio circuitry 38 is in an active mode (e.g., cellular radio 38 is actively transmitting radio-frequency signals to base station emulator 54 over the protocol-based wireless connection). When the call session is terminated, cellular radio circuitry 38 is in a sleep mode. The power amplifier circuitry of circuitry 38 may be turned on in the active mode and turned off in the sleep mode.

At step 132, a timer may be started that sets a period of time (e.g., 250 ms) during which data packets are conveyed back and forth between DUT 10 and signaling tester 70. At step 134, signaling tester 70 may serve as a spectrum analyzer to analyze the acknowledgement packets received from circuitry 36. For example, signaling tester 70 may be directed to analyze the test packets to measure the transmit power level, transmitter constellation error, and transmit spectrum mask. If desired, other radio-frequency performance metrics such as adjacent channel leakage ratio, signal-to-noise ratio, frequency response, gain, and gain compression may be measured at step 134.

Processing may loop back to step 130 to perform additional loopback testing (e.g., steps 130, 132, and 134 may be repeated for any suitable number of cycles to gather a sufficient set of measured data), as indicated by path 136. Processing may loop back to step 122 to perform testing at another setting (e.g., to select another communications protocol, channel, and data rate for testing), as indicated by path 138.

After sufficient data has been gathered across the desired settings (e.g., across the different protocols, bands, channels, data rates, etc.), test host 56 may be used to determine whether DUT 10 is a passing DUT or a failing DUT. For example, if the gathered data exhibits satisfactory transmit performance (e.g., acceptable transmit power levels, transmitter constellation errors, and/or transmit spectrum masks), DUT 10 may be marked as a passing DUT (step 140). If the gathered data exhibits unsatisfactory performance levels, circuitry 36 fails to satisfy design criteria and DUT 10 may be reconfigured with new design settings aimed to improve WiFi® transceiver circuitry performance (step 142, e.g., increase the distance between the WiFi® transceiver and the cellular radio, provide better ground plane to dissipate heat, or add thermal pad).

Figure 10:
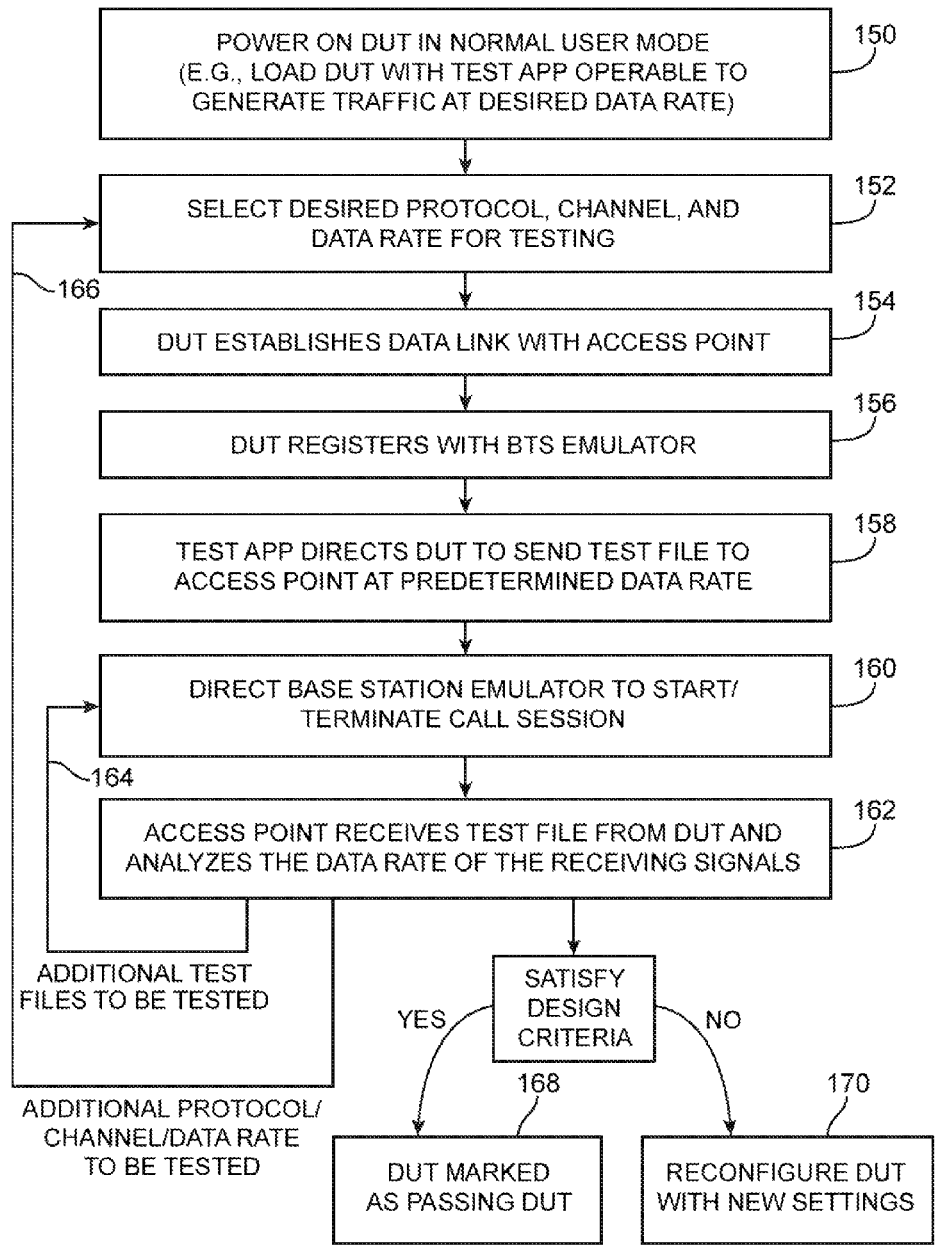

In another suitable signaling test arrangement, DUT 10 may be loaded with a normal user operating system that includes a traffic generating test application. Steps involved in testing this type of DUT are shown in FIG. 10. At step 150, DUT 10 is powered on in normal user mode (e.g., DUT 10 is loaded with a test application operable to generate test traffic at desired data rates). At step 152, test host 56 may select a desired protocol, channel, and data rate for testing. For example, test host 56 may configure circuitry 36 for transmission of radio-frequency signals using the 802.11n protocol in the 5 GHz band at 150 Mbps.

At step 154, DUT 10 may establish a protocol-compliant data communications link with access point 70. At step 156, DUT 10 automatically registers with base station emulator 54 (e.g., DUT 10 notifies base station emulator 54 of its presence). At step 158, the test application running on DUT 10 may direct WiFi® transceiver circuitry 36 to send a test file to access point 70 at a selected data rate. For example, circuitry 36 may be directed to send a 3 MB test file at a selected data rate of 12 Mbps. Sending the 30 MB test file may therefore take two seconds (3*8/12).

At step 160, test host 56 may direct base station emulator 54 to begin/terminate a call session. During an active telephone call session, radio circuitry 38 is in an active mode (e.g., the power amplifier circuitry in circuitry 38 is turned on). When the call session is terminated, cellular radio circuitry 38 is in a sleep mode (e.g., the power amplifier circuitry in circuitry 38 is turned off).

At step 162, access point 70 may finish receiving the test file from DUT 10 and analyze the data rate at which the test file is received. The analyzed data rate may be stored in test host 56 or in storage and processing circuitry 28 of DUT 10 (as examples).

Processing may loop back to step 160 until the test file is completely transmitted, as indicated by path 164. Processing may loop back to step 152 to perform testing at another setting (e.g., to select another communications protocol, channel, and data rate for testing), as indicated by path 166.

After sufficient data has been gathered across the desired settings (e.g., across the different protocols, bands, channels, data rates, etc.), test host 56 may be used to determine whether DUT 10 is a passing DUT or a failing DUT. For example, if the measured data rate is equal to or sufficiently close to the selected data rate (e.g., if the measured data rate is within one percent of the expected data rate), DUT 10 may be marked as a passing DUT (168). If the measured data rate is unacceptable lower than the selected data rate (e.g., if the measured data rate is more than one percent less than the expected data rate), circuitry 36 fails to satisfy design criteria and DUT 10 may be reconfigured with new design settings aimed to improve WiFi® transceiver circuitry performance (step 170).

Steps shown in FIGS. 8-10 are merely illustrative. These validation techniques may be used to test WiFi® transceiver performance during product design and during production testing.

The foregoing is merely illustrative of the principles of this invention and various modifications can be made by those skilled in the art without departing from the scope and spirit of the invention.

What is claimed is:

1. A method of testing a device under test in a test system, wherein the device under test comprises a first wireless transceiver circuit and a second wireless transceiver circuit, the method comprising:

directing the first wireless transceiver circuit to transmit radio-frequency signals at a desired output power level;
  while the first wireless transceiver circuit is transmitting radio-frequency signals at the desired output power level and while the second wireless transceiver circuit is rising in temperature as a result of transmitting radio-frequency signals with the first wireless transceiver circuit, directing the second wireless transceiver circuit to transmit test radio-frequency signals; and
  with a tester, analyzing the test radio-frequency signals.

2. The method defined in claim 1, wherein analyzing the test radio-frequency signals comprises measuring a performance parameter selected from the group consisting of: a transmit power level, a transmitter constellation error, and a transmit spectrum mask.

3. The method defined in claim 1, wherein the first wireless transceiver circuit comprises a cellular telephone transceiver circuit and wherein directing the first wireless transceiver circuit to transmit the radio-frequency signals comprises:
   directing the cellular telephone transceiver circuit to transmit the radio-frequency signals.

4. The method defined in claim 1, wherein the second wireless transceiver circuit comprises a wireless local area network transceiver circuit and wherein directing the second wireless transceiver circuit to transmit the test radio-frequency signals comprises:
   directing the wireless local area network transceiver circuit to transmit the test radio-frequency signals.

5. The method defined in claim 1, wherein:
   the first wireless transceiver circuit comprises a cellular telephone transceiver circuit;
   the second wireless transceiver circuit comprises a wireless local area network transceiver circuit;
   directing the first wireless transceiver circuit to transmit the radio-frequency signals comprises directing the cellular telephone transceiver circuit to transmit the radio-frequency signals; and
   directing the second wireless transceiver circuit to transmit the test radio-frequency signals comprises directing the wireless local area network transceiver circuit to transmit the test radio-frequency signals.

6. The method defined in claim 1, wherein the test system includes a test host and wherein directing the first wireless transceiver circuit to transmit the radio-frequency signals comprises:
   with the test host, directing the first wireless transceiver circuit to transmit the radio-frequency signals at a maximum output power level.

7. The method defined in claim 1, further comprising:
   turning off the first wireless transceiver circuit to prevent the first wireless transceiver circuit from transmitting radio-frequency signals; and
   while the first wireless transceiver circuit is turned off and while the second wireless transceiver circuit is falling in temperature as a result of turning off the first wireless transceiver circuit, analyzing the test radio-frequency signals using the tester.

8. The method defined in claim 7, wherein:
   the device under test comprises a cellular telephone;
   the first wireless transceiver circuit comprises a cellular telephone transceiver circuit;
   the second wireless transceiver circuit comprises a wireless local area network transceiver circuit;
   directing the first wireless transceiver circuit to transmit the radio-frequency signals comprises directing the cellular telephone transceiver circuit to transmit the radio-frequency signals; and
   directing the second wireless transceiver circuit to transmit the test radio-frequency signals comprises directing the wireless local area network transceiver circuit to transmit the test radio-frequency signals.

9. A method of testing a device under test in a test system, wherein the device under test includes a first wireless transceiver circuit and a second wireless transceiver circuit and wherein the test system includes a base station emulator and a wireless local area network circuit, the method comprising:
   directing the first wireless transceiver circuit in the device under test to wirelessly communicate with the base station emulator;
   while the first wireless transceiver circuit is transmitting radio-frequency signals to wirelessly communicate with the base station emulator and while the second wireless transceiver circuit is rising in temperature as a result of transmitting the radio-frequency signals with the first wireless transceiver circuit, directing the second wireless transceiver circuit to establish a data communications link with the wireless local area network circuit; and
   while the data communications link is established between the second wireless transceiver circuit and the wireless local area network circuit, performing loopback testing by sending radio-frequency data between the device under test and the wireless local area network circuit.

10. The method defined in claim 9, wherein the wireless local area network circuit comprises a wireless local area network access point and wherein directing the second wireless transceiver circuit to establish the data communications link with the wireless local area network circuit comprises:
    directing the second wireless transceiver circuit to establish the data communications link with the wireless local area network access point.

11. The method defined in claim 9, wherein directing the second wireless transceiver circuit to establish the data communications link with the wireless local area network circuit comprises:
    directing the second wireless transceiver circuit to establish a protocol-compliant data communications link between the device under test and the wireless local area network circuit.

12. The method defined in claim 9, wherein performing loopback testing comprises:
    directing the wireless local area network circuit to transmit test packets to the second wireless transceiver circuit;
    in response to receiving the test packets from the wireless local area network circuit, transmitting acknowledgement packets to the wireless local area network circuit using the second wireless transceiver circuit; and
    with the wireless local area network circuit, analyzing the acknowledgement packets transmitted by the second wireless transceiver circuit.

13. The method defined in claim 12, wherein analyzing the acknowledgement packets comprises measuring a performance parameter selected from the group consisting of: a transmit power level, a transmitter constellation error, and a transmit spectrum mask.

14. The method defined in claim 9, wherein the first wireless transceiver circuit comprises a cellular telephone transceiver circuit and wherein directing the first wireless transceiver circuit to wirelessly communicate with the base station emulator comprises:
    directing the cellular telephone transceiver circuit to wirelessly communicate with the base station emulator.

15. The method defined in claim 9, wherein the second wireless transceiver circuit comprises a wireless local area network transceiver circuit and wherein directing the second wireless transceiver circuit to establish the data communications link with the wireless local area network circuit comprises:
    directing the wireless local area network transceiver circuit to establish the data communications link with the wireless local area network circuit.

16. The method defined in claim 9, wherein:
the first wireless transceiver circuit comprises a cellular telephone transceiver circuit;
the second wireless transceiver circuit comprises a wireless local area network transceiver circuit;
directing the first wireless transceiver circuit to wirelessly communicate with the base station emulator comprises directing the cellular telephone transceiver circuit to wirelessly communicate with the base station emulator; and
directing the second wireless transceiver circuit to establish the data communications link with the wireless local area network circuit comprises directing the second wireless transceiver circuit to establish the data communications link with the wireless local area network circuit.

17. A method of testing a device under test in a test system, wherein the device under test includes a first wireless transceiver circuit and a second wireless transceiver circuit and wherein the test system includes a base station emulator and a wireless local area network circuit, the method comprising:
directing the first wireless transceiver circuit in the device under test to wirelessly communicate with the base station emulator;
while the first wireless transceiver circuit is transmitting radio-frequency signals to wirelessly communicate with the base station emulator and while the second wireless transceiver circuit is rising in temperature as a result of transmitting the radio-frequency signals with the first wireless transceiver circuit, directing the second wireless transceiver circuit to establish a data communications link with the wireless local area network circuit; and
while the data communications link is established between the second wireless transceiver circuit and the wireless local area network circuit, directing the second wireless transceiver circuit to send data to the wireless local area network circuit.

18. The method defined in claim 17, wherein the wireless local area network circuit comprises a wireless local area network access point and wherein directing the second wireless transceiver circuit to establish the data communications link with the wireless local area network circuit comprises:
directing the second wireless transceiver circuit to establish the data communications link with the wireless local area network access point.

19. The method defined in claim 17, wherein directing the second wireless transceiver circuit to establish the data communications link with the wireless local area network circuit comprises:
directing the second wireless transceiver circuit to establish a protocol-compliant data communications link between the device under test and the wireless local area network circuit.

20. The method defined in claim 17, wherein directing the second wireless transceiver circuit to send the data comprises directing the second wireless transceiver circuit to send the data at a data rate, the method further comprising:
receiving the data using the wireless local area network circuit; and
with the wireless local area network circuit, obtaining a measured data rate for the received data, wherein the measured date rate is at most equal to the data rate.

21. The method defined in claim 17, wherein the first wireless transceiver circuit comprises a cellular telephone transceiver circuit and wherein directing the first wireless transceiver circuit to wirelessly communicate with the base station emulator comprises:
directing the cellular telephone transceiver circuit to wirelessly communicate with the base station emulator.

22. The method defined in claim 17, wherein the second wireless transceiver circuit comprises a wireless local area network transceiver circuit and wherein directing the second wireless transceiver circuit to establish the data communications link with the wireless local area network circuit comprises:
directing the wireless local area network transceiver circuit to establish the data communications link with the wireless local area network circuit.

23. The method defined in claim 17, wherein:
the first wireless transceiver circuit comprises a cellular telephone transceiver circuit;
the second wireless transceiver circuit comprises a wireless local area network transceiver circuit;
directing the first wireless transceiver circuit to wirelessly communicate with the base station emulator comprises directing the cellular telephone transceiver circuit to wirelessly communicate with the base station emulator; and
directing the second wireless transceiver circuit to establish the data communications link with the wireless local area network circuit comprises directing the wireless local area network circuit to establish the data communications link with the wireless local area network circuit.

* * * * *